United States Patent
Kikuchi et al.

(10) Patent No.: US 11,214,359 B2
(45) Date of Patent: Jan. 4, 2022

(54) FLOW CONTROL SYSTEM, FLOW CONTROL METHOD, AND AIRCRAFT

(71) Applicant: SUBARU CORPORATION, Tokyo (JP)

(72) Inventors: Maki Kikuchi, Tokyo (JP); Hiroki Kato, Tokyo (JP); Mitsuru Kono, Tokyo (JP); Kentaro Yoshida, Tokyo (JP); Nobuyuki Nakazato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 440 days.

(21) Appl. No.: 16/223,964

(22) Filed: Dec. 18, 2018

(65) Prior Publication Data

US 2019/0300159 A1    Oct. 3, 2019

(30) Foreign Application Priority Data

Mar. 27, 2018 (JP) .............................. JP2018-06043 8

(51) Int. Cl.
| | |
|---|---|
| B64C 23/00 | (2006.01) |
| B64C 13/16 | (2006.01) |
| B64C 13/50 | (2006.01) |
| H05H 1/24 | (2006.01) |
| G05D 1/10 | (2006.01) |
| G05D 1/08 | (2006.01) |
| F15D 1/00 | (2006.01) |

(52) U.S. Cl.
CPC ............ *B64C 23/005* (2013.01); *B64C 13/16* (2013.01); *B64C 13/50* (2013.01); *G05D 1/0825* (2013.01); *G05D 1/106* (2019.05); *H05H 1/2406* (2013.01); *B64C 2230/12* (2013.01); *F15D 1/0075* (2013.01)

(58) Field of Classification Search
CPC ....... B64C 23/005; B64C 13/16; B64C 13/50; B64C 2230/12; H05H 1/2406
See application file for complete search history.

(56) References Cited

U.S. PATENT DOCUMENTS

| | | | | |
|---|---|---|---|---|
| 7,624,941 | B1* | 12/2009 | Patel ...................... | F42B 10/38 244/3.22 |
| 8,220,753 | B2* | 7/2012 | Silkey ................... | B64C 23/005 244/205 |
| 8,308,112 | B2* | 11/2012 | Wood .................... | H05H 1/2406 244/205 |
| 8,708,651 | B2* | 4/2014 | Greenblatt ............ | H05H 1/2406 416/24 |
| 9,067,674 | B2* | 6/2015 | Nordin .................. | H05H 1/2406 |
| 9,446,840 | B2* | 9/2016 | Drouin, Jr. ............ | H05H 1/2406 |

(Continued)

FOREIGN PATENT DOCUMENTS

| | | |
|---|---|---|
| JP | 2008-290710 A | 12/2008 |
| JP | 2013-530486 A | 7/2013 |
| JP | 2014-166816 A | 9/2014 |

*Primary Examiner* — Brian M O'Hara
*Assistant Examiner* — Michael B. Kreiner
(74) *Attorney, Agent, or Firm* — Troutman Pepper Hamilton Sanders LLP

(57) ABSTRACT

A flow control system includes a movable wing attachable to a wing of an aircraft, and a plasma actuator mountable on a surface of the movable wing. The flow control system is configured to control air flow around the wing by having the changing of the steering angle of the movable wing work in conjunction with the operation of the plasma actuator.

10 Claims, 3 Drawing Sheets

(56) References Cited

U.S. PATENT DOCUMENTS

| | | | |
|---|---|---|---|
| 9,573,678 B2* | 2/2017 | Golling | B64C 21/08 |
| 9,656,740 B2* | 5/2017 | Golling | B64C 13/16 |
| 10,358,208 B2* | 7/2019 | Lin | B64C 21/08 |
| 2009/0212164 A1 | 8/2009 | Osborne et al. | |
| 2011/0253842 A1 | 10/2011 | Silkey et al. | |
| 2014/0239126 A1 | 8/2014 | Hara | |
| 2016/0152324 A1* | 6/2016 | Graff | B64C 21/10 |
| | | | 137/561 R |

* cited by examiner

FLOW CONTROL SYSTEM, FLOW CONTROL METHOD, AND AIRCRAFT

CROSS-REFERENCE TO RELATED APPLICATIONS

The present application claims priority from Japanese Patent Application No. 2018-060438 filed on Mar. 27, 2018, the entire contents of which are hereby incorporated by reference.

BACKGROUND

1. Technical Field

Examples of the present invention relate to a flow control system, a flow control method, and an aircraft.

2. Related Art

Movable wings such as ailerons, rudders, elevators, flaps, spoilers, and flaperons are known as components for controlling air flow around wings of aircraft, such as the main wings and the tail wings. There is also known an aircraft in which a plurality of spoilers are provided at the trailing edge of the main wing (Japanese Unexamined Patent Application Publication (JP-A) No. 2014-166816). The orientation of the aircraft or flying object can be controlled by changing the angle of these movable wings.

Further, in recent years, studies have been made on the use of plasma actuators (PA) as an auxiliary device for controlling air flow around airplane wings (see, for instance, JP-A No. 2013-530486 and JP-A No. 2008-290710). A practical application for plasma actuators mounted on airplane wings is DBD-PA, which uses dielectric barrier discharges (DBD) to create air flow.

DBD-PA is a plasma actuator in which electrodes are arranged across a dielectric, and plasma is generated only on one side of the dielectric by applying a high AC voltage between the electrodes. By using a DBD-PA, delamination of air is suppressed and air flow is changed by controlling the plasma. For this reason, attempts have been made to omit movable wings such as ailerons and flaps by attaching DBD-PA's to the wings. That is, DBD-PA is expected to be an alternative element for the steering surface of an aircraft.

SUMMARY OF THE INVENTION

An aspect of the present invention provides a flow control system including a movable wing attachable to a wing of an aircraft, and a plasma actuator mountable on a surface of the movable wing. The flow control system is configured to control air flow around the wing by having the changing of the steering angle of the movable wing work in conjunction with the operation of the plasma actuator.

An aspect of the present invention provides an aircraft including a flow control system. The flow control system includes a movable wing attachable to a wing of the aircraft, and a plasma actuator mountable on a surface of the movable wing. The flow control system is configured to control air flow around the wing by having the changing of the steering angle of the movable wing work in conjunction with the operation of the plasma actuator.

An aspect of the present invention provides a flow control method for controlling air flow around a wing of an aircraft including a flow control system. The flow control system includes a movable wing attachable to a wing of the aircraft, and a plasma actuator mountable on a surface of the movable wing. The flow control system is configured to control air flow around the wing by having the changing of the steering angle of the movable wing work in conjunction with the operation of the plasma actuator.

An aspect of the present invention provides a flow control method for controlling air flow around a wing by changing of a steering angle of a movable wing attachable to a wing of an aircraft and by operating a plasma actuator mountable on a surface of the movable wing.

DETAILED DESCRIPTION OF THE DRAWINGS

In the following, some preferred examples of the present invention are described in detail with reference to the accompanying drawings. Note that the following description is directed to illustrative instances of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following instances which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the present invention is omitted.

When the air flow changes unsteadily due to abrupt maneuvering of the aircraft, gusts, or the like, and the orientation of the aircraft changes, it is necessary to operate the movable wings in order to restore the orientation of the aircraft. However, the response speed of the air frame when the movable wing is operated depends on the size of the movable wing. That is, the larger the size of the movable wing, the faster the response speed of the airframe. Therefore, when a high-speed response is required, it is necessary to increase the size of the movable wing.

However, if the size of the movable wing increases, it is necessary to increase the size of the actuator for steering the movable wing. This not only results in reduction of loading space inside a wing structure such as a main wing provided with movable wings but also increases the weight of the airframe. Moreover, as the size of the movable wing increases, it becomes difficult to operate the movable wing at high speeds with only the actuator.

It is therefore desirable to improve the response speed of an airframe even with a movable wing of a smaller size.

(Configuration and Function of the Flow Control System)

Figure 1:
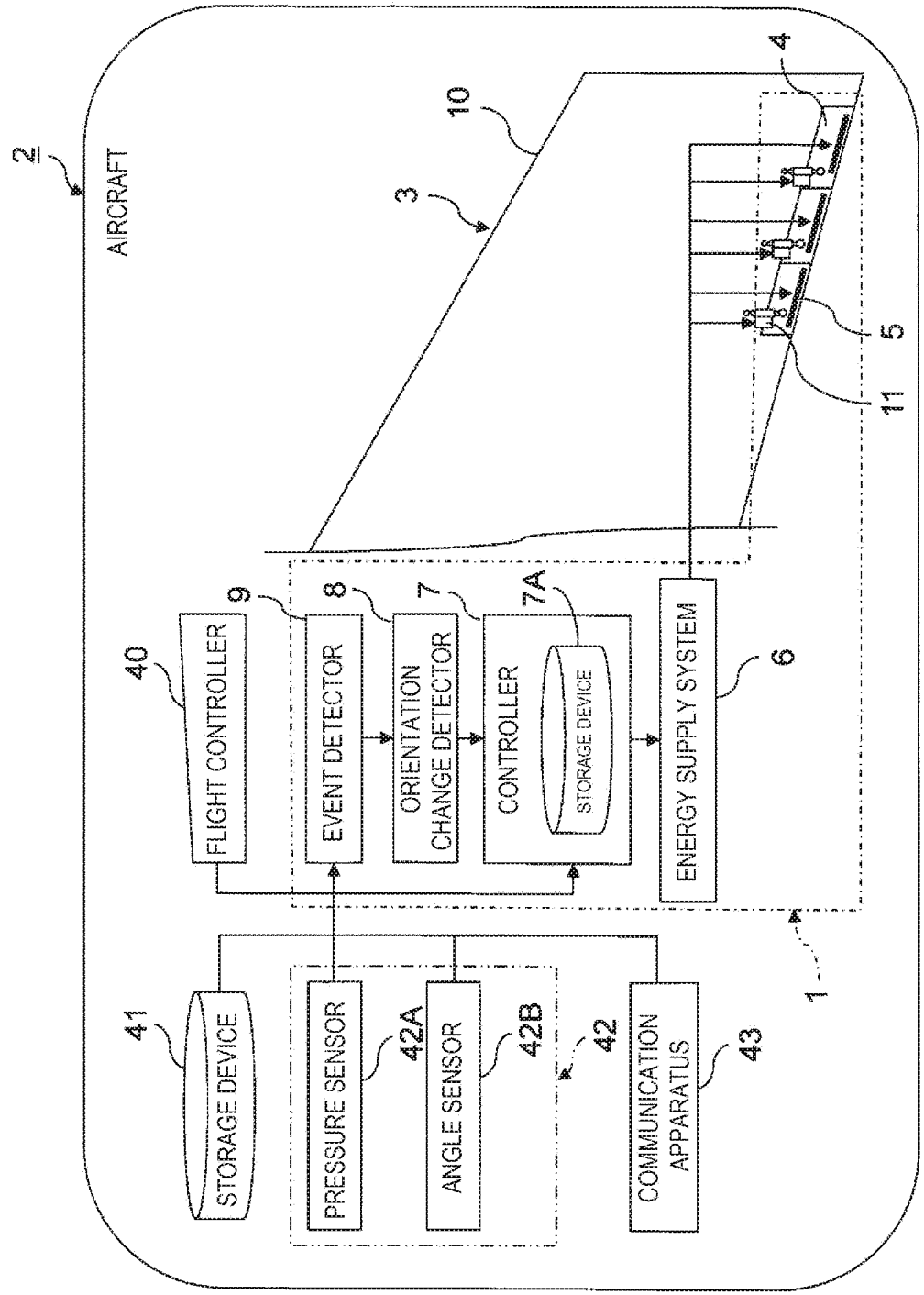
FIG. 1 is a partial configuration diagram of an aircraft including a flow control system according to an example of the present invention.

FIG. 1 is a partial configuration diagram of an aircraft including a flow control system according to an example of the present invention.

The flow control system 1 controls air flow around the wing of the aircraft 2. For this purpose, the flow control system 1 is provided on an aircraft 2 having a wing 3, such as a main wing and a tail wing. In the case of the aircraft 2 having a wing 3, the aircraft 2 is not limited to a fixed wing aircraft and may be a flying body. The aircraft 2 may be an unmanned aircraft or a manned aircraft.

The flow control system 1 may include a movable wing 4, a plasma actuator 5, an energy supply system 6, a controller 7, an orientation change detector 8, and an event detector 9.

The movable wing 4 connects to the wing 3 of the aircraft 2 and forms part of the wing 3. That is, the wing 3 is configured by providing a stationary wing 10 with a movable wing 4. Examples of a movable wing 4 include an aileron, a rudder, an elevator, a flap, a spoiler, a flaperon, and the like. The movable wing 4 may be driven by mechanical (i.e., hydraulic, pneumatic, electric, etc.) actuators 11.

As illustrated in FIG. 1, a plurality of movable wings 4 may be connected to one stationary wing 10. In this case, an actuator 11 for driving the movable wing 4 is connected to each of the movable wings 4. Therefore, each movable wing 4 can be individually driven by an actuator 11. Each movable wing 4 illustrated in FIG. 1 is an aileron.

The plasma actuator 5 is mounted on the surface of the movable wing 4. The mounting position of the plasma actuator 5 may be determined and set to a suitable position by a wind tunnel test, simulation, or the like. Therefore, in the instance shown in FIG. 1, the plasma actuator 5 is disposed at the trailing edge of the movable wing 4, but may be disposed at the leading edge of the movable wing 4. In the example shown in FIG. 1, the plasma actuator 5 is disposed on the upper surface of the movable wing 4, but may be disposed on the lower surface of the movable wing 4 or on both the upper surface and the lower surface.

When a plurality of movable wings 4 are provided for each stationary wing 10 as illustrated in FIG. 1, the plasma actuator 5 may be attached to the surface of each movable wing 4. Further, the plasma actuator 5 may be attached to the stationary wing 10.

Figure 2:
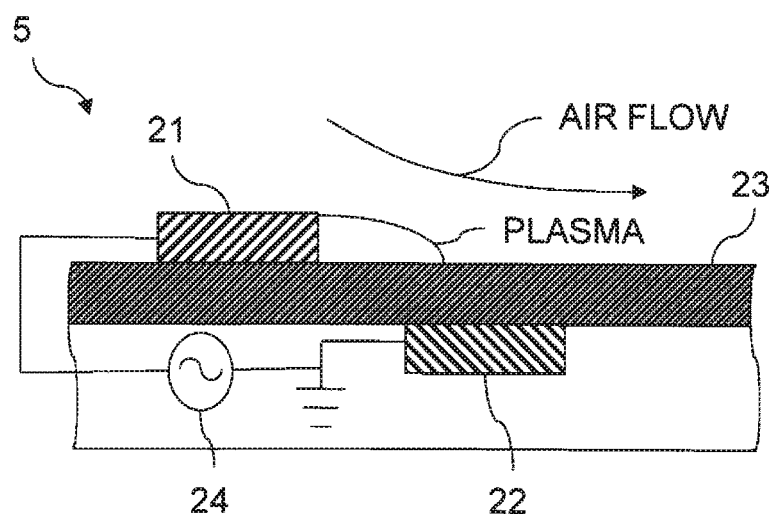
FIG. 2 is a diagram illustrating the principle of the plasma actuator illustrated in FIG. 1.

FIG. 2 is a diagram illustrating the principle of the plasma actuator 5 illustrated in FIG. 1.

The plasma actuator 5 comprises a first electrode 21, a second electrode 22, a dielectric 23, and an AC power supply 24. The first electrode 21 and the second electrode 22 are arranged to be shifted with relative to each other with the dielectric 23 interposed therebetween so that a discharge area is formed. The first electrode 21 is disposed so as to be exposed to a space in which air flow is to be induced. On the other hand, the second electrode 22 is covered with a dielectric 23 so as not to be exposed to the space in which air flow is to be induced. The second electrode 22 is grounded to the airframe of the aircraft 2. An AC voltage is applied between the first electrode 21 and the second electrode 22 by an AC power supply 24.

When the AC power supply 24 is operated to apply an AC voltage between the first electrode 21 and the second electrode 22, plasma composed of electrons and positive ions is generated in a discharge area formed on the surface of the dielectric 23 on the side where the first electrode 21 is disposed. As a result, air flow toward the surface of the dielectric 23 is induced by the plasma. The plasma actuator 5 that induces the dielectric barrier discharge by interposing the dielectric 23 between the first electrode 21 and the second electrode 22 is called a DBD-PA.

The first electrode 21 and the second electrode 22 constituting the plasma actuator 5 may each be in the form of a thin film. Therefore, it can be used by being attached to a surface of the movable wing 4 or embedded in a surface layer serving as an attachment position.

When the plasma actuator 5 is attached to the movable wing 4, air flow around the wing 3 can be controlled by both the change in the steering angle of the movable wing 4 and the operation of the plasma actuator 5. In this way, it is possible to reduce the size of the movable wing 4.

Figure 3:
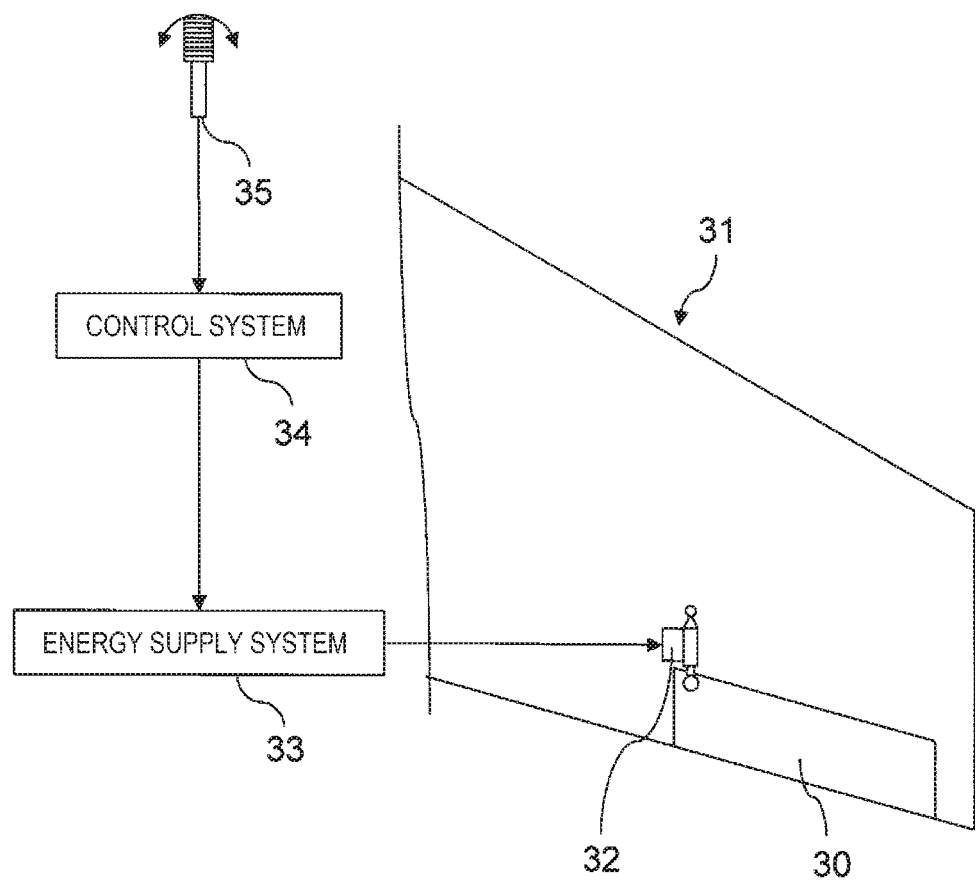
FIG. 3 is a diagram illustrating an example configuration of a conventional wing provided with a movable wing.

FIG. 3 is a diagram illustrating an example configuration of a wing 31 including a conventional movable wing 30.

The movable wing 30 provided in a conventional wing 31 is also steered by a mechanical actuator 32. The actuator 32 is driven by energy supplied from an energy supply system 33 such as a power supply, motor, pump, or the like which is controlled by a control system 34 that generates and outputs control signals. The control system 34 is connected to a joystick 35 which is maneuvered by a pilot.

When a steering command of the movable wing 30 is given to the control system 34 by operation of the joystick 35 by the pilot, the control system 34 outputs a control signal corresponding to the steering command of the movable wing 30 to the energy supply system 33. As a result, energy corresponding to the steering command of the movable wing 30 is outputted from the energy supply system 33 to the actuator 32, and the movable wing 30 is steered by driving the actuator 32.

When the plasma actuator 5 is attached to the movable wing 4 as illustrated in FIG. 1, the size of the movable wing 4 can be reduced. Specifically, mounting the plasma actuator 5 can shorten the length of the movable wing 4 as compared to the length of a conventional movable wing 30 without plasma actuator 5 being mounted. If the length of the movable wing 4 can be shortened, the rigidity required for the actuator 11 to steer the movable wing 4 may be reduced because the movable wing 4 has a cantilever structure. As a result, the weight of the entire movable wing 4 including the actuator 11 can be reduced. Further, it is possible to subdivide the movable wing 4 in the wing chord direction.

Therefore, as illustrated in FIG. 1, a plurality of movable wings 4 can be connected to one stationary wing 10, and the plasma actuator 5 can be attached to the surface of each movable wing 4. The size of each movable wing 4 may be reduced by operating each movable wing 4 in conjunction with the corresponding plasma actuator 5 to control air flow around the wing 3. That is, by arranging a plurality of movable wings 4 adjacent to each other in the wing chord direction of each wing 3, it is possible to reduce the size and weight of the movable wings 4 while maintaining the flow control effect.

The actuator 11 for steering the movable wing 4 and the plasma actuator 5 can be driven by energy outputted from the energy supply system 6. That is, the energy supply system 6 drives the actuator 11 by supplying energy to the actuator 11 corresponding to the driving method of the actuator 11, and operates the plasma actuator 5 by supplying power to the AC power supply 24 of the plasma actuator 5.

For example, if the actuator 11 is hydraulic or pneumatic, the energy supply system 6 may comprise a pump and a power source for driving the pump. The actuator 11 can then be driven by applying hydraulic pressure or pneumatic pressure to the actuator 11 from the energy supply system 6. If the actuator 11 is an electric type, the energy supply system 6 can be composed of a motor and a power source for driving the motor. The actuator 11 can then be driven by transmitting rotational torque from the motor of the energy supply system 6 to the actuator 11.

The controller 7 controls the movable wing 4 and the plasma actuator 5 by outputting a control signal to the energy supply system 6. In particular, the controller 7 can be provided with a function of operating the movable wing 4 in conjunction with the plasma actuator 5. That is, by changing the steering angle of the movable wing 4 in conjunction with operating the plasma actuator 5 under the control of the controller 7, air flow around the wing 3 can be controlled.

Thus, when the plasma actuators 5 are attached to each of the surfaces of the plurality of movable wings 4 as illustrated in FIG. 1, the steering angles of the plurality of movable wings 4 and the operating conditions of the plasma actuators 5 can be controlled in accordance with the desired orientation of the aircraft 2 as a target object. That is, if the movable wings 4 are subdivided as illustrated in FIG. 1, the steering angles of the plurality of movable wings 4 and the outputs of the plurality of plasma actuators 5 may be individually set and controlled. Therefore, it is possible to optimally control the steering angles of the plurality of movable wings 4 and the outputs of the plurality of plasma actuators 5 in accordance with local changes in air flow or the like.

Preferable combinations of steering angles of the plurality of movable wings 4 and outputs of the plurality of plasma actuators 5 to achieve desired orientations of the aircraft 2 may be obtained by a wind tunnel test or a simulation. A storage device 7A configured to store information may then be provided to the controller 7, the information being information from a table, a function, or the like associating desired orientations of the aircraft 2 with the combinations of suitable steering angles of the plurality of movable wings 4 and the outputs of the plurality of plasma actuators 5 for each of the desired orientations of the aircraft 2. Consequently, the controller 7 can set the steering angles of the plurality of movable wings 4 and the outputs of the plurality of plasma actuators 5 suitable for obtaining the desired orientation of the aircraft 2 by referring to information stored in the storage device 7A.

The desired orientation of the aircraft 2 can be indicated to the controller 7 by operation of a flight controller 40 or by a flight program for automatic cruising of the aircraft 2. Therefore, the control signal of the movable wing 4 to be outputted to the energy supply system 6 from the controller 7 can be generated on the basis of the flight program of the aircraft 2 if the aircraft 2 is in automatic cruising mode. On the other hand, when the aircraft 2 is being operated by an operator, the control signal of the movable wing may be generated in accordance with information for instructing the steering of the movable wing 4 inputted by operation of the flight controller 40.

If the aircraft 2 is a manned aircraft, the flight controller 40 is a joystick or the like disposed in the pilot's cockpit, but if the aircraft 2 is an unmanned aircraft, the flight controller 40 is a control device for remote control disposed outside the aircraft 2.

The control signal of the movable wing 4 may be generated as a signal indicating the extent to which the movable wing 4 is to be driven by the actuator 11. On the other hand, the control signal of the plasma actuator 5 may be generated as a signal indicating the waveform of the AC voltage from the AC power supply 24 to be applied between the first electrode 21 and the second electrode 22. It has been confirmed by tests that burst waveforms, in addition to continue waveforms, are effective as waveforms for the AC voltage from the AC power supply 24 applied between the first electrode 21 and the second electrode 22 of the plasma actuator 5.

Figure 4:
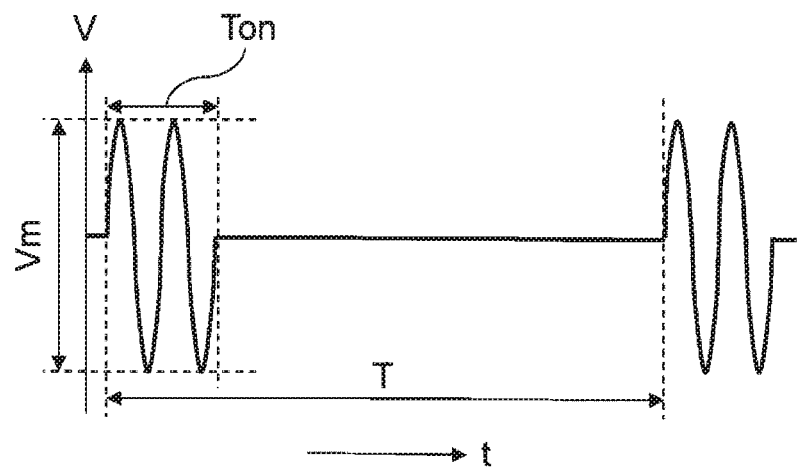
FIG. 4 is a graph representing a waveform of a typical burst wave.

FIG. 4 is a graph showing a waveform of a typical burst wave.

In FIG. 4, the vertical axis represents voltage V, and the horizontal axis represents time t. As shown in FIG. 4, the burst wave is a wave which repeats a cycle, at a constant burst period T, consisting of a period in which the amplitude varies and a period in which the amplitude does not vary. Accordingly, when the waveform of the AC voltage is a burst wave, the period Ton in which the AC voltage of the amplitude Vm is continuously applied is intermittently repeated with a burst period T. The ratio Ton/T of the period Ton, in which the AC voltage is applied, to the burst period T corresponds to the duty ratio and is called a burst ratio BR.

Therefore, the output of the plasma actuator 5 is not limited to the amplitude of the AC voltage, and whether to use a burst wave or a continuous wave and, when a burst wave is used, the burst period T and the burst ratio BR can be expressed as parameters. The relationship between the waveform of the AC voltage from the AC power supply 24 applied between the first electrode 21 and the second electrode 22 and the air flow formed by the operation of the plasma actuator 5 can be obtained in advance by a wind tunnel test or a simulation.

The response speed of flow control by the plasma actuator 5 is orders of magnitude higher than the response speed of flow control by steering of the movable wing 4. More specifically, although the response speed of the plasma actuator 5 depends on the speed of air flow, the response speed is 100 Hz or higher. On the other hand, the response speed to changes in steering angle of the movable wing 4 is about 30 Hz. Accordingly, it is possible to control air flow by operating the plasma actuator 5 before changing the steering angle of the movable wing 4 is completed.

Therefore, the control signal of the plasma actuator 5 to be outputted from the controller 7 to the energy supply system 6 may be automatically generated based on changes in orientation of the aircraft 2. Needless to say, not only the control signal of the plasma actuator 5 but also the control signal of the movable wing 4 may be generated based on changes in orientation of the aircraft 2.

For this purpose, the orientation change detector 8 detects or predicts changes in orientation of the airframe of the aircraft 2 and notifies the controller 7 of detected or predicted changes in orientation of the aircraft 2. The event detector 9 detects events that cause changes in orientation of the aircraft 2, and notifies the orientation change detector 8 of the detected event.

The controller 7 is configured to automatically generate a control signal for the plasma actuator 5 based on changes in orientation of the aircraft 2 notified from the orientation change detector 8, and to output the generated control signal for the plasma actuator 5 to the energy supply system 6. Further, if necessary, the controller 7 is configured to automatically generate a control signal of the movable wing 4 based on changes in orientation of the aircraft 2 notified from the orientation change detector 8, and to output the generated control signal of the movable wing 4 to the energy supply system 6.

The controller 7, the orientation change detector 8, and the event detector 9 can be composed of electronic circuits such as an A/D (analog-to-digital) converter, a D/A (digital-to-analog) converter, and a computer in which programs are read. Therefore, the controller 7, the orientation change detector 8, and the event detector 9 may be integrated.

Events that cause a change in orientation of the aircraft 2 include, for example, changes in weather such as gust winds, approach of obstacles, approach to areas to detour, and malfunctions of devices, as well as the input of orientation control information of the aircraft 2 such as an operation of the pilot system 40 by the pilot of aircraft 2 and an instruction for a change in orientation of the aircraft 2 during automatic cruising by the flight program of the aircraft 2.

Therefore, the event detector 9 is connected to a flight controller 40 provided in the aircraft 2; a storage device 41 for storing a flight program, weather information, terrain information, and the like; sensors 42, such as a pressure sensor 42A and an angle sensor 42B provided in the aircraft 2; and a communication apparatus 43. The event detector 9 is configured to detect an event causing a change in orientation of the aircraft 2 based on information acquired from at least one of the flight controller 40, the storage device 41, the sensors 42, or the communication apparatus 43.

As a specific example, when the flight controller 40 instructs an abrupt orientation change of the aircraft 2, or when a flight program of the aircraft 2, read from the storage device 41 to the controller 7, instructs an abrupt orientation change of the aircraft 2, the event detector 9 may determine that an event that causes a change in orientation of the aircraft 2 has occurred.

The pressure sensor 42A can also detect a gust of wind in the event detector 9 by detecting a variation in the pressure distribution on the aircraft body surface of the aircraft 2, and the angle sensor 42B can also detect a change itself in the orientation of the aircraft body of the aircraft 2. Therefore, even when a gust of wind is detected or a change in the orientation of the aircraft 2 itself is detected, it may be determined that an event that causes a change in the orientation of the aircraft 2 has occurred in the event detector 9.

The event detector 9 can also obtain terrain information and weather information from the storage device 41 or by using the communication apparatus 43. If weather information can be obtained, it is possible to specify the relative positional relationship between the aircraft 2 and airspace with the probability of cumulonium clouds occurring being high or airspace with cumulonium clouds being already present, which are considered as one of causes of lightning, or airspaces to be preferably avoided such as those in which hail, rain, or snow falls. Further, if terrain information can be obtained, the relative positional relationship between the position of an obstacle, such as a hill, and the aircraft 2 may also be specified.

Further, it is also possible to specify the relative positional relationship between an airspace, in which volcanic ash is scattered, and the aircraft 2, or the relative positional relationship between the aircraft 2 and an airspace in which the probability of flocks of birds occurring is high. That is, if information for specifying the area to be detoured by the aircraft 2 is stored in the storage device 41 in advance, or if such information can be obtained by using the communication apparatus 43, the event detector 9 can specify the area to be detoured by the aircraft 2. When the aircraft 2 approaches an area to detour, the event detector 9 can specify that an event has occurred which may cause a change in the orientation of the aircraft 2.

The communication apparatus 43 can also be used to locate other aircrafts flying around the aircraft 2 by communicating with the other aircrafts or control towers and aircrafts on the ground. Therefore, the distance between the aircraft 2 and other aircrafts flying closest can be calculated. If the distance between the aircraft 2 and other aircrafts flying closest falls below a predetermined distance, the aircraft 2 should change the orientation of aircraft 2 in order to avoid collision with the other aircraft. Therefore, if the distance between the aircraft 2 and another aircraft flying closest to the aircraft falls below a predetermined distance, the event detector 9 can determine that an event that may cause a change in orientation of the aircraft 2 has occurred.

Alternatively, the position of the other aircraft flying around the aircraft 2 may be tracked by the event detector 9, and the position of the other aircraft may be predicted after a predetermined time. That is, it is possible to detect the velocity including the orientation of the other aircraft by detecting the change in the spatial position of the other aircraft with time, and to predict the position of the other aircraft after a predetermined time based on the detected velocity. Then, when the predicted distance between the aircraft 2 and the other aircraft after a predetermined time becomes equal to or less than a predetermined distance, the event detector 9 can then determine that an event that may cause a change in orientation of the aircraft 2 has occurred in the event detector 9.

Further, necessary sensors may be arranged to detect faults in components (e.g., the engine, a part of the wing 4) that affect the orientation of the aircraft 2. When a failure of a component that affects the orientation of the aircraft 2 is detected, the event detector 9 can specify that an event has occurred that may cause a change in orientation of the aircraft 2.

In addition, the event detector 9 may perform predictions by making use of artificial intelligence technologies. As a specific example, operational information of the aircraft 2, in cases corresponding to flight conditions, such as an approach of an obstacle or another aircraft, a change in weather, may be accumulated as statistical data and used by the event detector 9 to predict and perform maneuvers in a case of similar flight conditions being encountered. That is, it is possible to predict steering patterns of the aircraft 2 according to flight conditions through machine learning.

As in the specific example described above, when the event detector 9 determines that an event has occurred that may cause a change in orientation of the aircraft 2 and the content of the event is reported to the orientation change detector 8, the orientation change detector 8 can detect or predict a change in orientation of the aircraft 2 according to the content of the event.

For example, when an orientation change of the aircraft 2 is directed by operation of the flight controller 40 or the flight program of the aircraft 2, the orientation change detector 8 may predict the orientation of the aircraft 2 after the orientation change is made in accordance with the instruction of the orientation change of the aircraft 2.

When gusts are detected, the orientation of the aircraft 2 after being affected by the gusts can be predicted by the orientation change detector 8 based on databases indicating relationships between gust conditions and orientation changes of the aircraft 2 due to the gusts obtained in advance by numerical hydrodynamic (computational fluid dynamics) analysis, a wind tunnel test, or the like. As described above, gust conditions can be expressed by a pressure distribution of air on the surface of the aircraft 2.

If the orientation change of the aircraft 2 is detected by the angle sensor 42B, the orientation of the aircraft 2 after the detected change can be used as a detection result of the orientation of the aircraft 2. Further, the orientation of the aircraft 2 after being changed by another event can be predicted by the orientation change detector 8 by using the detected orientation of the aircraft 2 as an initial state.

When the aircraft 2 approaches an obstacle, another aircraft, or an area to detour, the orientation change detector 8 may predict the orientation of the aircraft 2 after a predetermined period of time based on statistical data of maneuvering content obtained by the above-described machine learning.

Thus, a change in orientation of the aircraft 2 can be detected or predicted by the orientation change detector 8 based on, for example, at least one of a flight program of the aircraft 2, operational information of the flight controller 40 by the device of the aircraft 2, the position of another aircraft flying in the vicinity of the aircraft 2, the pressure distribution of air on the surface of the aircraft 2 measured by the pressure sensor 42A provided in the aircraft 2, the orientation of the aircraft 2 measured by the angle sensor 42B provided in the aircraft 2, weather information, terrain information, or information for specifying an area to be detoured by the aircraft 2.

As a practical example, the orientation of aircraft 2 at a predetermined time after aircraft 2 can be predicted by the orientation change detector 8 based on the current position and weather information of aircraft 2, the current position and topographic information of aircraft 2, or the current position of aircraft 2 and the position of other aircraft 2 flying in the vicinity of aircraft 2. As another practical example, the actual orientation change of the aircraft 2 affected by weather conditions can be predicted based on the operation information of the aircraft 2 and weather conditions such as gusts and strong winds.

When the orientation change of the aircraft 2 is detected or predicted by the orientation change detector 8 as described above, the controller 7 can generate at least a control signal of the plasma actuator 5 based on the detected or predicted orientation change of the aircraft 2. That is, it is possible to generate a control signal for both the movable wing 4 and the plasma actuator 5 or a control signal for the plasma actuator 5 based on the orientation change of the aircraft 2.

The control signals of both the movable wing 4 and the plasma actuator 5 or the control signal of the plasma actuator 5 can be generated so that the orientation of the aircraft 2 becomes more suitable based on the orientation change of the aircraft 2 detected or predicted by the orientation change detector 8. Therefore, the plasma actuator 5 operates under conditions for changing the orientation of the aircraft 2 detected or predicted by the orientation change detector 8.

As a specific example, when the movable wing 4 is steered by the flight program or operation of the flight controller 40, the orientation of the aircraft 2 may actually deviate from the target value due to weather conditions such as gusts or other factors. In the controller 7, it is possible to predict the deviation of the orientation from the target orientation of the aircraft 2 based on the change of the orientation of the aircraft 2 predicted by the orientation change detector 8, and generate a control signal of the plasma actuator 5 so that the plasma actuator 5 operates under conditions for canceling the predicted deviation. In this case, the control amount can also be corrected so that the deviation amount from the target value is canceled for the movable wing 4.

As another example, an orientation after a predicted change in orientation of the aircraft 2 may not be suitable, such as when the aircraft 2 is approaching an obstacle, another aircraft, or an area to detour, etc. Also, even when a sudden maneuver is performed, the orientation of the aircraft 2 may become unstable.

The controller 7 then determines whether the orientation of the aircraft 2 after the predicted change in the orientation of the aircraft 2 is suitable in the orientation change detector 8, and if it is determined that the orientation of the aircraft 2 after the change is not suitable, the control signal of the plasma actuator 5 can be generated so that the plasma actuator 5 operates under a condition for causing the orientation of the aircraft 2 to be suitable after the change. Also in this case, the movable wing 4 can be steered under a condition for causing the orientation of the aircraft 2 to be suitable. That is, the steering angle of the movable wing 4 can be adjusted based on the predicted or detected orientation of the aircraft 2.

For example, in order to reduce the risk of the aircraft colliding with or intruding into an obstacle, another aircraft, an area to detour, or the like as described above, the orientation of the aircraft 2 to be changed may be determined as unsuitable, when the controller 7 determines such that the orientation of the aircraft 2, after changing the orientation of the aircraft 2, is an orientation with the risk of the aircraft 2, colliding with or intruding into the area to be avoided, being a certain level or more. In view of this, the plasma actuator 5 or the plasma actuator 5 with the movable wing 4 can be controlled such that the orientation of the aircraft 2 would be an orientation which reduces the risk of colliding with an object to be avoided or entering an area to be avoided.

That is, when the aircraft 2 is likely to collide with an object or enter an undesirable air space, collision with the object or entry into the undesirable air space can be avoided by operating the plasma actuator 5 or correcting the control amount of the movable wing 4. In this case, instead of canceling the deviation amount of the attitude of the aircraft 2, the control device 7 intentionally shifts and corrects the orientation of the aircraft 2. Of course, both cancellation of the deviation amount of the orientation of the aircraft 2 and the correction of the orientation of the aircraft 2 may be performed.

As another practical example, it is possible to predict a change in the orientation of the aircraft 2 due to steering of the movable wings 4 when the movable wings 4 are steered abruptly, and to operate the plasma actuator 5 under suitable conditions based on the predicted change in the orientation of the aircraft 2 so that the orientation of the aircraft 2 does not become unstable. That is, when the movable wing 4 is steered abruptly, the orientation of the aircraft 2 may be stabilized by operation of the plasma actuator 5.

In addition to the various controls described above, in the event that a part of the plurality of movable wings 4 fails, the controller 7 may control steering of the remaining movable wings 4 that have not failed and operate the plasma actuator 5 under conditions for reducing the effect of failure of the movable wing 4 on air flow.

(Flow Control Method)

Next, a method of controlling air flow around the wings of the aircraft 2 using the flow control system 1 will be described.

Figure 5:
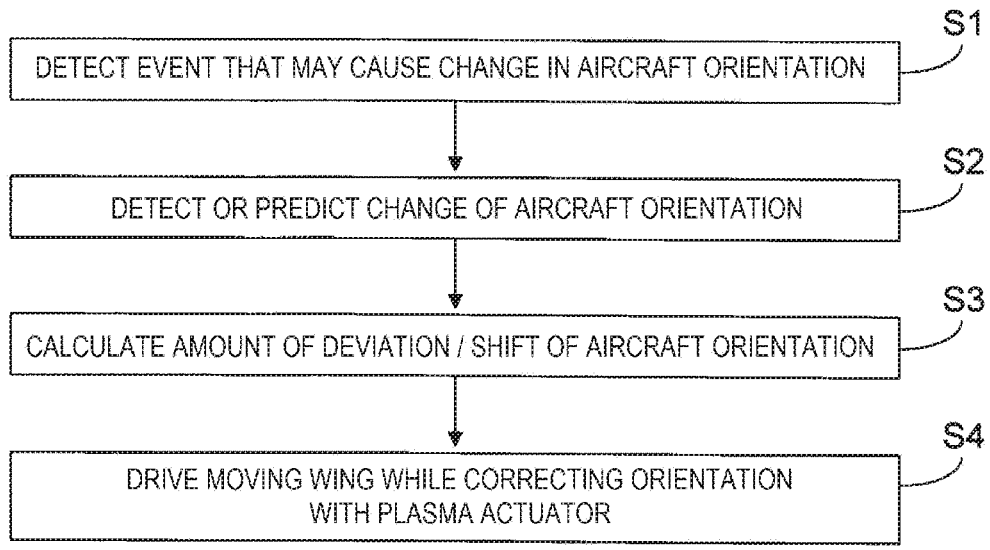
FIG. 5 is a flowchart showing a progression of controlling air flow around a wing of an aircraft using the flow control system of FIG. 1.

FIG. 5 is a flowchart showing a progression of controlling air flow around the wing of the aircraft 2 using the flow control system 1 of FIG. 1.

First, in step S1, the event detector 9 of the flow control system 1 detects an event that may cause a change in orientation of the aircraft 2. As for specific examples, instructions to change orientation of the aircraft 2 by automatic or manual operation, weather changes such as gusts, an approach of the aircraft 2 to an object to avoid collision with, an approach of the aircraft 2 to an area to avoid collision in, a failure of a device constituting the aircraft 2, or the like. An event detected by the event detector 9 is notified to the orientation change detector 8.

Next, in step S2, the orientation change of the aircraft 2 corresponding to the event causing the orientation change of the aircraft 2 is detected or predicted by the orientation change detector 8. The detected or predicted orientation change of the aircraft 2 is notified to the controller 7.

Next, in step S3, the controller 7 calculates at least one of the deviation from a target value or amount of the shift from a target value for the orientation of the aircraft 2. For instance, the controller 7 calculates the deviation of the orientation of the aircraft 2 due to gusts or the like, an suitable correction amount for the orientation of the aircraft 2 for avoiding a decrease in stability due to a sudden change in the orientation of the aircraft 2, an suitable correction amount for the orientation of the aircraft 2 for avoiding an excessive approach of the aircraft 2 to an object or an area to be avoided, and the like.

Next, in step S4, the movable wing 4 is driven while the orientation of the aircraft 2 is corrected by the plasma actuator 5 under the control of the controller 7. That is, air flow around the wing 3 is controlled by changing the steering angle of the movable wing 4 that is connected the wing 3 of the aircraft 2 in conjunction with operating the plasma actuator 5 attached to the movable wing 4.

As a specific example, when the deviation of the orientation of the aircraft 2 with respect to the target value obtained by steering the movable wings 4 is calculated, the plasma actuator 5 cancels the deviation of the orientation of the aircraft 2. On the other hand, when the shift amount for optimizing the orientation of the aircraft 2 obtained by steering of the movable wings 4 is calculated, the plasma actuator 5 shifts the orientation of the aircraft 2 by the shift amount.

For this purpose, control signals for the movable wing 4 and the plasma actuator 5 are generated in the controller 7, and the generated control signals are outputted to the energy supply system 6. By doing so, energy corresponding to the control amount of the movable wing 4 is supplied from the energy supply system 6 to the actuator 11. Consequently, the actuator 11 is driven, and the steering angle of the movable wing 4 is adjusted. On the other hand, power is supplied from the energy supply system 6 to the AC power supply 24 of the plasma actuator 5. As a result, the plasma actuator 5 operates to form air flow for canceling the deviation of the orientation of the aircraft 2 attained by steering the movable wings 4 or air flow for shifting the orientation of the aircraft 2 attained by steering of the movable wings 4. As a result, a more suitable air flow can be formed around the wings 3 of the aircraft 2.

(Effect)

In the flow control system 1, the flow control method, and the aircraft 2 described above, the plasma actuator 5 is attached to the movable wing 4, and air flow around the wing 3 is controlled by changing the steering angle of the movable wing 4 in conjunction with operating the plasma actuator 5.

Therefore, with the flow control system 1, the flow control method, and the aircraft 2, it is possible to reduce the size and weight of the movable wing 4. In particular, if the movable wing 4 is subdivided, the steering angles of the plurality of movable wings 4 and the outputs of the plurality of plasma actuators 5 can be individually set and controlled. Therefore, it is possible to optimally control the steering angles of the plurality of movable wings 4 and the outputs of the plurality of plasma actuators 5 in accordance with local changes in air flow or the like. Even in the case of malfunctions occurring in some of the movable wings 4, the orientation of the aircraft 2 may be controlled by steering the remaining movable wings 4.

Moreover, the response speed of the plasma actuator 5 is higher than the response speed of changes in the steering angle of the movable wing 4. Accordingly, it is possible to control air flow by operating the plasma actuator 5 before changing the steering angle of the movable wing 4 is completed. Therefore, the orientation of the aircraft 2 obtained by changing the steering angle of the movable wing 4 can be corrected by operating the plasma actuator 5. That is, by operating the movable wing 4 in conjunction with the plasma actuator 5, the response speed in the orientation change of the aircraft 2 can be improved compared with the case where the orientation of the aircraft 2 is changed only by changing the steering angle of the movable wing 4.

The operating conditions of the plasma actuator 5 can also be suitably determined by detecting or predicting in advance changes in the orientation of the aircraft 2. As a practical example, when the aircraft 2 encounters a gust of wind or when a maneuver that directs a sudden orientation change is performed, the operation of the plasma actuator 5 can avoid or reduce a decrease in stability due to an unintentional change in orientation or a sudden orientation change of the aircraft 2 caused by the gust of wind.

OTHER EXAMPLES

While specific examples have been described above, the described examples are by way of example only and are not intended to limit the scope of the present invention. The novel methods and apparatus described herein may be embodied in a variety of other manners. Various omissions, substitutions and changes may be made in the manner of the methods and apparatus described herein without departing from the spirit of the present invention. The appended claims and their equivalents include such various forms and modifications as fall within the scope and spirit of the present invention.

The invention claimed is:

1. A flow control system, comprising:
a movable wing attachable to a wing of an aircraft, and
a plasma actuator mountable on a surface of the movable wing, wherein
the flow control system is configured to control air flow around the wing by changing a steering angle of the movable wing in conjunction with operating the plasma actuator,
the flow control system further comprising an orientation change detector device configured to detect or predict a change in orientation of the aircraft,
wherein at least the plasma actuator is configured to operate under a condition responding to the detected or predicted change in orientation of the aircraft, and
wherein the orientation change detector device is configured to detect or predict the change in the orientation of the aircraft, based on at least one of a position of another aircraft flying in a vicinity of the aircraft or information for specifying an area to be detoured by the aircraft.

2. The flow control system of claim 1, wherein
the movable wing comprises a plurality of movable wings attached to one stationary wing, each of the movable wings having the plasma actuator mounted thereon.

3. The flow control system according to claim 1, wherein
the movable wing comprises a plurality of movable wings attached to one stationary wing, each of the movable wings having the plasma actuator mounted thereon, and the flow control system further comprises:
- a controller configured to control the steering angle of each of the movable wings and operating conditions of each of the plasma actuators in accordance with a desired orientation of the aircraft.

4. The flow control system of claim 1, wherein the orientation change detector device is configured to predict the orientation of the aircraft after a predetermined period of time based on the position of the aircraft and the position of the another aircraft flying in the vicinity of the aircraft.

5. The flow control system according to claim 1, wherein
the orientation change detector device is configured to predict the change in the orientation of the aircraft, and
the flow control system further comprises:
- a controller configured to predict an orientation deviation from a target value of the orientation of the aircraft based on the predicted orientation change of the aircraft, and operate the plasma actuator under a condition for canceling the predicted deviation.

6. The flow control system of claim 1, wherein
the orientation change detector is configured to predict the change in the orientation of the aircraft,
the flow control system further comprises:
- a controller configured to determine whether the orientation of the aircraft after the predicted change in the orientation of the aircraft is suitable, and, in a case of the orientation of the aircraft after the change being determined to be unsuitable, operate the plasma actuator under a condition for causing the orientation of the aircraft to be suitable after the change.

7. The flow control system according to claim 6, wherein
the controller is configured to determine that the orientation of the aircraft after the change in the orientation of the aircraft is unsuitable in a case of a determination being made that the orientation of the aircraft has a predetermined level or higher level of risk of colliding with an object to be avoided by the aircraft or entering an area to be avoided by the aircraft.

8. An aircraft comprising the flow control system according to claim 1.

9. The flow control system of claim 1, wherein
the information for specifying the area to be detoured by the aircraft includes at least one of an information of airspace with a high probability of cumulonium clouds occurring, an information of airspace with cumulonium clouds being present, an information of airspace in which hail, rain, or snow falls, an information of airspace in which volcanic ash is scattered, or an information of airspace with a high probability of flocks of bird occurring.

10. A flow control method for controlling air flow around a wing of an aircraft that includes a plasma actuator mountable on a surface of a movable wing comprising:
- detecting or predicting the change in an orientation of the aircraft based on at least one of position of another aircraft flying in a vicinity of the aircraft or information for specifying an area to be detoured by the aircraft, and
- operating the plasma actuator under a condition responding to the detected or predicted change in orientation of the aircraft.

* * * * *